Aug. 23, 1966  R. M. TUCK ET AL  3,267,769
TRANSMISSION
Filed Jan. 9, 1964
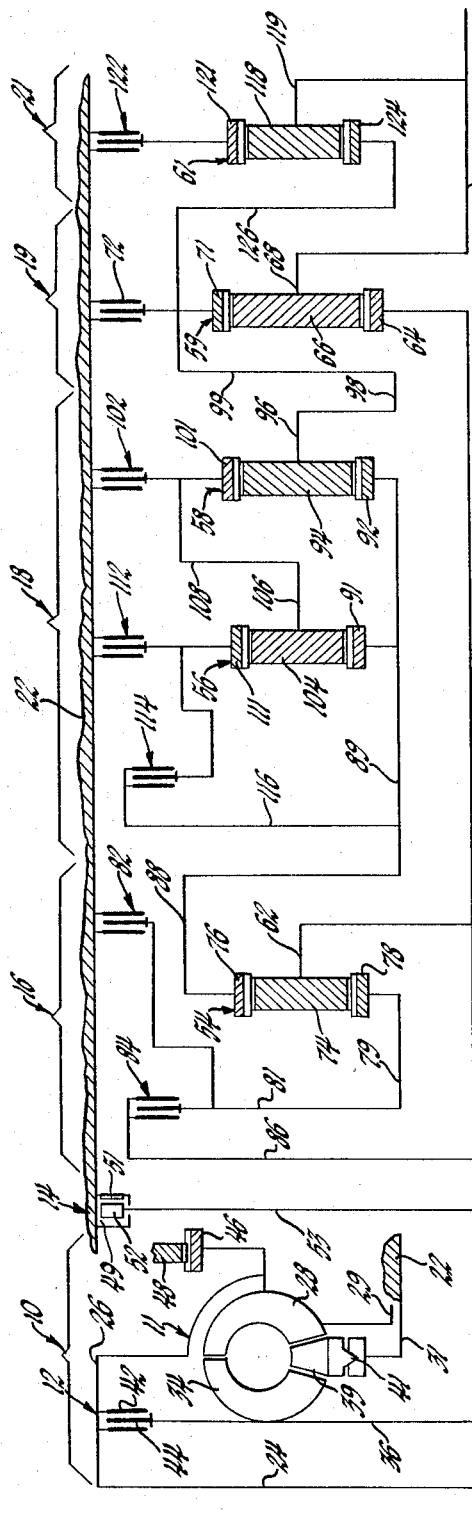
INVENTOR.
Robert M. Tuck &
BY Marion D. Smith
a. W. Heiter
ATTORNEY

United States Patent Office 3,267,769
Patented August 23, 1966

3,267,769
TRANSMISSION
Robert M. Tuck and Marion D. Smith, both of Indianapolis, Ind., assignors to General Motors Corporation, Detroit, Mich., a corporation of Delaware
Filed Jan. 9, 1964, Ser. No. 336,755
33 Claims. (Cl. 74—759)

This invention relates to variable speed transmissions and particularly to variable speed transmissions employing hydrodynamic torque converter and planetary gear drive arrangements.

In heavy duty transmission utilized to multiply and transmit high torque level inputs from an engine to a load to be driven, it is advantageous to employ a hydrodynamic torque converter to provide infinitely variable speed and torque variations within limited ranges to extend the range of usefulness of the engine and provide smooth drive operation. When planetary gear drive arrangements capable of transmitting and multiplying high input torque levels are combined with the torque converter, the range of usefulness of the engine can be further extended. In these drive gear arrangements, it is desirable to achieve such extended variable speed and torque ranges with minimum size and weight increases over present day transmissions of lesser capacity. Furthermore, in vehicles such as heavy hauling type vehicles it is desirable to provide high torque multiplication for high starting effort in the lowest drive range and relatively even and small ratio steps between succeeding drive ranges for accelerating the load without large changes in engine speed to reduce shift shock and to keep engine power at a maximum as much as possible. In addition, it is frequently desirable that there be provided an overdrive ratio to enhance the economy of motor vehicle operation.

This invention employs a hydrodynamic torque converter unit having a driving pump, a turbine driven by the pump and a stator providing torque multiplication combined with a change speed gear unit having plural power paths arranged to provide splitting of the torque in the range gearing to permit the use of smaller and lighter drive range components than would be ordinarily required for a transmission of given capacity having conventional gearing. The turbine drives a converter output shaft and a converter lockup clutch is provided which is effective to lock up the torque converter and effect a mechanical drive connection between the converter output shaft and the input to the converter. In the range gearing, the converter output shaft provides input via a first torque path to a two speed torque splitter planetary gear unit and to a first input element of a torque multiplying and torque combining planetary gear unit. Output from the two speed torque splitter planetary gear unit provides via a second torque path a second input to a second input element of the torque multiplying and torque combining planetary gear unit via a three speed planetary gear unit, and input to a reversing planetary gear unit is via the torque multiplying and torque combining planetary gear unit. The converter output shaft passes centrally through the two speed torque splitter planetary gear unit and the three speed planetary gear unit. Output from the torque multiplying and torque combining planetary gear unit and the reversing planetary gear unit is to a transmission output shaft and thence by suitable drive connections to the vehicle wheels.

These gear units make available at least seven forward drive ratios and one reverse drive ratio between the transmission output shaft and the converter output shaft. The first forward drive ratio which is the one considered the lowest and provides the greatest torque multiplication is provided by the torque multiplying and torque combining planetary gear unit which in this instance acts solely as a torque multiplying means to provide a reduction drive or low low drive ratio between the converter output shaft and the transmission output shaft. In the remaining six forward drive ratios, the path of turbine torque to the torque multiplying and torque combining planetary gear unit is split; with one path continuing to drive the first input element and the second path passing through the combination two speed splitter and three speed planetary unit to drive the second input element. The two speed torque splitter planetary gear unit selectively offers a splitter high ratio and a splitter low ratio between the input to the three speed planetary gear unit and the converter output shaft by providing a direct drive ratio and either an overdrive ratio or an underdrive ratio, and the three speed planetary gear unit selectively offers a low drive ratio and an intermediate drive ratio which are reduction ratios and a high drive ratio which is a direct drive ratio between the input and output of this gear unit to drive the second input element of the torque multiplying and torque combining planetary gear unit. The first input element of the torque multiplying and torque combining planetary gear unit is driven at converter output shaft speeds and the second input element of this gear unit is either grounded or is driven at six different speeds determined by six selected combinations of the drive ratios in the two speed torque splitter planetary gear unit and the three speed planetary gear unit. The torque multiplying and torque combining planetary gear unit combines the drive effort which has been split by the two speed torque splitter planetary gear unit, and the relative speed differences between the two input elements of the torque multiplying and torque combining planetary gear unit determine the six forward drive ratios which begin with the second forward drive ratio and continue through the seventh forward drive ratio which is considered the highest drive ratio in the transmission and may be an overdrive ratio. The second forward drive ratio is provided by the combination of the splitte rlow drive ratio of the splitter gear unit and the greatest reduction ratio of the three speed gear unit which is the low drive ratio. The third forward drive ratio is provided by engagement of the splitter high drive ratio of the splitter gear unit while the three speed gear unit is retained in its low drive ratio status. The fourth forward drive ratio is provided by reengaging the splitter low drive ratio in the splitter gear unit and engaging the intermediate drive ratio of the three speed gear unit. The fifth forward drive ratio is provided by reengaging the splitter high drive ratio of the splitter gear unit while the three speed gear unit is retained in its intermediate drive ratio status. The sixth forward drive ratio which is a direct drive ratio is provided by reengaging the splitter low drive ratio of the splitter gear unit and engaging the high or direct drive ratio of the three speed gear unit. The seventh forward drive ratio is provided by reengaging the splitter high drive ratio of the splitter planetary gear unit while the three speed planetary gear unit retains its high or direct drive ratio status. When the splitter high drive ratio is an overdrive ratio and the splitter low drive ratio is a direct drive ratio the sixth forward drive ratio provides a direct drive ratio between the converter output shaft and transmission output shaft and the seventh forward drive ratio provides an overdrive ratio, the latter being desirable to enhance the economy of motor vehicle operation. When the splitter high drive ratio is a direct drive ratio and the splitter low drive ratio is an underdrive ratio, the sixth forward drive ratio provides a reduction drive and the seventh forward drive ratio provides direct drive. The drive ratios in the torque multiplying and torque combining gear unit, the three speed planetary gear unit, and the torque splitter planetary gear unit are apportioned so that in the first forward drive ratio there is provided high torque multiplication for high starting effort and even and small ratio steps between the succeeding forward drive ratios to permit ratio changes without large changes in engine speed to reduce shift shock during acceleration and to keep engine power at a maximum as much as possible. The reversing planetary gear unit in combination with the torque multiplying and torque combining planetary gear unit provides a reverse drive ratio which is a reduction ratio to rotate the transmission output shaft in a direction opposite that of the converter output shaft and at a reduced speed.

An object of this invention is to provide in a variable speed transmission improved gear drive arrangements.

Another object of this invention is to provide in a variable speed transmission improved planetary gear drive arrangements employing torque splitting and torque combining planetary gear drive arrangements.

Another object of this invention is to provide in a variable speed transmission improved hydrodynamic torque converter and planetary gear drive arrangements employing plural power paths.

Another object of this invention is to provide in a variable speed transmission a hydrodynamic torque converter unit providing input to a torque splitter planetary gear unit which apportions the input torque between one input element of a torque multiplying and torque combining planetary gear unit and a torque multiplying and torque transmitting planetary gear unit which provides multiple reduction input drive and direct input drive to a second input element of the torque multiplying and torque combining planetary gear unit and final output from the torque multiplying and torque combining planetary gear unit.

Another object of this invention is to provide in a planetary gear drive arrangement a two speed torque splitter planetary gear unit for apportioning input torque between one input element of a torque multiplying and torque combining planetary gear unit and the input to a three speed planetary gear unit with output from the three speed planetary gear unit to a second input element of the torque multiplying and torque combining planetary gear unit and final output from the torque multiplying and torque combining planetary gear unit.

Another object of this invention is to provide in a planetary gear drive arrangement a torque multiplying and torque combining planetary gear unit having plural power input paths with one input power path having a direct drive connection to a power source and another input power path having a two speed torque splitter planetary gear unit offering a spltiter high drive ratio and a splitter low drive ratio drivingly connected to the power source for apportioning input torque to a three speed planetary gear unit offering a low reduction drive ratio, an intermediate reduction drive ratio and a direct drive ratio with the torque multiplying and torque combining planetary gear unit offering a low low reduction drive ratio with input by the one input power path and operable to combine plural power input paths to provide a final output to a load in a plurality of drive ratios.

Another object of this invention is to provide in a variable speed transmission a hydrodynamic torque converter, a converter lockup clutch operable to lock up the torque converter, a hydrodynamic brake operable to retard the output of the torque converter, a torque multiplying and torque combining planetary gear unit having dual power input paths from the torque converter with one path having a two speed torque splitter planetary gear unit for apportioning power input between the dual power paths and a three speed planetary gear unit, and a reversing torque multiplying planetary gear unit having input from the torque multiplying and torque combining planetary gear unit with the gear units thus combined being operable to selectively provide at least seven forward drive ratios and one reverse drive ratio and being apportioned so that one of the forward drive ratios provides high torque multiplication for high starting effort and the six remaining drive ratios have relatively even and small ratio steps therebetween for accelerating the load without great changes in engine speed and include an overdrive ratio.

Another object of this invention is to provide in a variable speed transmission the combination of an input shaft drivingly connected to the sun gear of a torque multiplying and torque combining planetary gear unit and to the input element of a two speed torque splitter planetary gear unit, the torque multiplying and torque combining planetary gear unit having carrier output to an output member and a controlled ring gear which may be retarded, a controlled element in the two speed torque splitter planetary gear unit which may be selectively braked or mechanically connected to the input member with output from the output element of this gear unit providing selectively a low and a high drive to a low sun gear and a high sun gear of low and intermediate planetary gear sets respectively in a three speed planetary gear unit with carrier output in the low planetary gear set to the ring gear of the torque multiplying and torque combining planetary gear unit, the low planetary gear set having a controlled ring gear which may be retarded and which is mechanically connected to the carrier output of the intermediate planetary gear set which has a controlled ring gear which may be retarded or selectively connected to the output element of the two speed torque splitter planetary gear unit, and a reversing planetary gear unit having an input sun gear connected to the ring gear of the torque multiplying and torque combining planetary gear unit, carrier output to the output shaft and a controlled ring gear which may be retarded.

These and other objects of the invention will be more apparent from the following description and drawing of preferred embodiments of the invention.

FIGURE 1 of the drawing shows diagrammatically one embodiment of the invention.

FIGURE 2 shows diagrammatically another embodiment of the invention.

Referring first to FIGURE 1 of the drawing, there is shown diagrammatically a transmission drive train illustrating features of this invention which comprises generally a torque converter and lockup clutch unit 10 having a hydrodynamic torque converter 11 and a converter lockup clutch 12, a hydrodynamic brake unit 14, a two speed torque splitter planetary gear unit 16, a three speed planetary gear unit 18, a torque multiplying and torque combining planetary gear unit 19 and a reversing planetary gear unit 21 all located in a transmission housing 22. These four gear units 16, 18, 19 and 21 offer, as will become apparent, at least seven forward speeds and one reverse speed.

Power input to the transmission drive train from an engine, not shown, is to an input hub 24 which is rotatably mounted in suitable bearings and connected to rotatably drive in a forward direction a torque converter housing 26 which has a rear curved portion to which the torque converter pump blades 28 are attached and a hub 29 which may be supported on a ground sleeve 31 secured to the transmission housing 22. The torque converter pump blades 28 deliver circulating fluid counterclockwise to the turbine blades 34 which are connected by an output hub 36 to rotatably drive in a forward direction a converter output shaft 38 which provides the input to the planetary gear units 16 and 19. As the fluid leaves the turbine blades 34, it is redirected to the pump blades 28 by stator blades 39 which are connected by a one-way brake 41 to the ground sleeve 31. The torque converter multiplies the torque input to the pump blades 28 with the torque gradually decreasing from stall with increasing turbine blade speed until the turbine blades 34 obtain a speed close to pump blade speed. At this point which corresponds to coupling speed of the torque converter there is no reaction at the stator blades 39 and the stator blades 39 are free to rotate in the forward direction since the one-way brake 41 only prevents reverse rotation.

The converter lockup clutch 12 has drive plates 42 splined to the torque converter housing 26 and a driven plate 44 sandwiched between these drive plates drivingly connected via the output hub 36 to the converter output shaft 38. This clutch when actuated is effective to prevent relative rotation between the torque converter housing 26 and the converter output shaft 38 to lock up the torque converter and provide a direct mechanical drive between the input hub 24 and the converter output shaft 38.

An auxiliary power take-off is provided by an external toothed annular gear 46 outward of and concentric with the converter output shaft 38 which is drivingly connected to the converter housing 26 and meshes with a gear 48. The gear 48 continuously rotates at a speed proportional to the speed of the input hub 24 and may be connected via suitable drive train means to auxiliary power equipment, not shown.

The hydrodynamic brake unit 14 is located between the torque converter 11 and the two speed torque splitter planetary gear unit 16 and in a brake chamber 49 provided in the transmission housing 22. An annular series of radial vanes 51 which provide the stator element of the hydrodynamic brake are located in brake chamber 49 and fixed to housing 22. An annular series of radial vanes 52 mounted on a brake hub 53 secured to the converter output shaft 38 provide the rotor element of the hydrodynamic brake and the hydrodynamic brake unit 14 is effective to retard the rotation of the converter output shaft 38 and thus the speed of the vehicle being driven upon the controlled supply of fluid to brake chamber 49. This controlled supply of fluid may be accomplished in any suitable known manner such as by the hydrodynamic brake control system explained in detail in Patent Number 2,864,473 Howard W. Christenson et al. entitled Transmission.

Referring now to the range gearing, the two speed torque splitter planetary gear unit 16 comprises a torque splitter planetary gear set 54, the three speed planetary gear unit 18 comprises an intermediate planetary gear set 56 and a low planetary gear set 58, the torque multiplying and torque combining planetary gear unit 19 comprises a torque multiplying and torque combining planetary gear set 59 and the reversing planetary gear unit 21 comprises a reversing planetary gear set 61. The converter output shaft 38 provides the input to the range gearing and drives the input planet carrier 62 of the torque splitter planetary gear set 54 and the sun gear 64 of the torque multiplying and torque combining planetary gear set 59.

In the torque multiplying and torque combining planetary gear set 59, the sun gear 64 meshes with a plurality of planetary pinions 66 journaled on an output planet carrier 68 which is drivingly connected to an output shaft 69. Output shaft 69 is drivingly connected in any suitable manner to the vehicle wheels, not shown, to drive the load. Pinions 66 mesh with a controlled ring gear 71 which may be restrained from rotation by a low low brake 72. When ring gear 71 is restrained from rotation by the low low brake 72, the reaction at this gear will cause the output planet carrier 68 and thus the output shaft 69 to be revolved in the same direction as the sun gear 64 which is driven by the converter output shaft 38 but at a reduced speed with respect thereto to provide a low low drive ratio which is a simple planetary reduction drive and provides the greatest torque multiplication and speed reduction in the range gearing.

In the torque splitter planetary gear set 54, a plurality of planetary pinions 74 journaled on the input planet carrier 62 mesh with an output ring gear 76 and a controlled sun gear 78 which is secured to a hub 79. Hub 79 is rotatably mounted in suitable bearings and is radially outward of and concentric with the converter output shaft 38. Connected to the hub 79 is a drum 81 which may be either restrained from rotation by an overdrive brake 82 or be prevented from rotation relative to the converter output shaft 38 by a direct drive clutch 84 which has a drive connection 86 to the converter output shaft 38. When direct drive clutch 84 is engaged, relative rotation between sun gear 78 and converter output shaft 38 is prevented and thus relative rotation between the planet carrier 62 and the sun gear 78 is prevented to lock up this gear set to provide the splitter low drive ratio which is a direct drive or 1:1 ratio between the ring gear 76 and the converter output shaft 38. When the sun gear 78 is restrained from rotation by the overdrive brake 82, the reaction at this gear will cause the ring gear 76 to be revolved in the same direction as the planet carrier 62 which is driven by the converter output shaft 38 but at an increased speed with respect thereto to provide the splitter high drive ratio which is an overdrive ratio between the ring gear 76 and the converter output shaft 38.

The two speed torque splitter planetary gear unit 16 and the three speed planetary gear unit 18 acting in combination are effective to provide another input power or torque path to the torque multiplying and torque combining planetary gear unit 19 in addition to the input power or torque path provided to the latter gear unit by the converter output shaft 38 with the two speed planetary gear unit 16 apportioning the input torque from the torque converter between these two power paths. Connected to the output ring gear 76 of the torque splitter planetary gear set 54 is a drum 88 which has its hub connected to a sleeve 89 located radially outward of and concentric with the converter output shaft 38. Sleeve 89 is rotatably mounted in suitable bearings and is drivingly connected to the sun gear 91 of the intermediate planetary gear set 56 and to the sun gear 92 of the low planetary gear set 58. In the low planetary gear set 58, the sun gear 92 meshes with a plurality of planetary pinions 94 journaled on an output planet carrier 96 which is secured to a hub 98 rotatably mounted in suitable bearings and the hub 98 which is radially outward of and concentric with the converter output shaft 38 is connected by a drive connection 99 to the ring gear 71 of the torque multiplying and torque combining planetary gear set 59. Pinions 94 mesh with a controlled ring gear 101 which may be restrained from rotation by a low brake 102. When ring gear 101 is restrained from rotation by the low brake 102, the reaction at the ring gear 101 will cause the planet carrier 96 and thus the ring gear 71 of the torque multiplying and torque combining planetary gear set 59 to be revolved in the same direction as the sun gear 92 but at a reduced speed with respect thereto to provide a low drive ratio.

In the intermediate planetary gear set 56, the sun gear 91 meshes with a plurality of planetary pinions 104 journaled on an output planet carrier 106 connected to a drum 108 which extends radially outward and is secured to the ring gear 101 of the low planetary gear set 58. The pinions 104 mesh with a controlled ring gear 111 which may be either restrained from rotation by an intermediate brake 112 or prevented from rotation relative to sleeve 89 by a direct drive clutch 114 which has a drive connection 116 to the sleeve 89. When the intermediate brake 112 is engaged, the ring gear 111 is held stationary and the rotation of the sun gear 91 causes pinions 104 to orbit in the ring gear 111 and by means of planet carrier 106 and drum 108, drives ring gear 101 of the low planetary gear set 58 in the same direction as sleeve 89 but at a reduced speed relative thereto. Thus, the ring gear 101 and the sun gear 92 of the low planetary gear set 58 are driven at the reduction speed provided by the intermediate planetary gear set 56 and the input speed of sleeve 89 respectively. The differential speed between sun gear 92 and the ring gear 101 of the low planetary gear set 58 causes the pinions 94 to revolve about the sun gear 92 thus driving the output planet carrier 96 in the same direction but at a reduced speed relative to sleeve 89 to provide an intermediate drive ratio which is higher than the low drive ratio previously mentioned provided by the low planetary gear set 58.

When the direct drive clutch 114 is engaged, the ring gear 111 is prevented from rotation relative to sun gear 91 and the pinions 104 are prevented from rotating relative to ring gear 111 and sun gear 91 to lock up the intermediate planetary gear set 56. Since the planet carrier 106 which is connected to drive the ring gear 101 of the low planetary gear set 58 is thus caused to rotate at the same speed as sleeve 89, the ring gear 101, sun gear 92 and pinions 94 of the low planetary gear set 58 are effectively locked up and rotate together without relative rotation and drive planet carrier 96 at the same speed as sleeve 89 to provide a direct or 1:1 drive ratio.

The reversing planetary gear set 61 comprises a plurality of planetary pinions 118 journaled on an output planet carrier 119 which is connected to the output shaft 69. Pinions 118 mesh with a ring gear 121 which may be restrained from rotation by a reverse brake 122 and with a sun gear 124 which is connected by a drum member 126 to the ring gear 71 of the torque multiplying and torque combining planetary gear set 59. When the reverse brake 122 is engaged to hold ring gear 121 stationary, the sun gear 64 transmits torque into the ring gear 71 through the pinions 66 with the output planet carrier 68 acting as a reaction member. The torque thus introduced into the drum member 126 by its connection to the ring gear 71 causes sun gear 124 to rotate in a direction opposite that of the converter output shaft 38 and since the ring gear 121 is held stationary, the pinions 118 orbit in the ring gear 121 in a direction opposite that of rotation of the converter output shaft 38 to drive through planet carrier 119 the output shaft 69 in the reverse direction to provide a reverse drive ratio.

The various brakes and clutches employed in the transmission diagrammatically shown in the drawing may be actuated in any known way, e.g., electrically, hydraulically, pneumatically or by some mechanical provision in a certain sequence.

The sequence of operation will be described in the following operational summary.

The transmission drive train described above as has been mentioned enables at least seven different forward drive ratios and a reverse drive ratio to be obtained. The first forward drive ratio and the one considered the lowest, produces the greatest torque multiplication available in this drive train arrangement for high starting effort and occurs when the low low brake 72 in gear unit 19 is engaged to hold the ring gear 71 of the torque multiplying and torque combining planetary gear set 59. Then, with the converter output shaft 38 being driven forwardly by the torque converter 11, the output planet carrier 68 and thus the output shaft 69 will be driven at a reduced speed relative to the converter output shaft 38 which is determined by the low low drive ratio. In the first forward drive ratio, the direct drive clutch 84 in gear unit 16 is also engaged to control the rotational speeds of the elements in the gear units 16 and 18.

In the remaining six forward drive ratios which are drive ratios two through seven, there is a dual power path to the torque multiplying and torque combining planetary gear unit 19 with advantage being gained from the use of this dual power path to permit the use of smaller, lighter drive range components in the range gearing than would be ordinarily required for a conventional transmission of given capacity having series arranged gearing. The two speed torque splitter planetary gear unit 16 apportions or splits the torque between the sun gear 64 of the torque multiplying and torque combining planetary gear unit 19 and the three speed planetary gear unit 18 which provides a second input to the torque multiplying and torque combining planetary gear unit 19 via the ring gear 71 of the latter gear unit with the combination of the two speed torque splitter planetary gear unit 16 and the three speed planetary gear unit 18 providing four reduction, one direct and one overdrive drives for the ring gear 71 of the torque multiplying and torque combining planetary gear unit 19. In the second forward drive ratio there is minimum power to the ring gear 71 of unit 19 by unit 18 with progressively increasing power to ring gear 71 as the transmission is upshifted with the seventh forward drive ratio determining the largest power input via unit 18 to ring gear 71.

To establish the second forward drive ratio, the low low brake 72 of gear unit 19 is disengaged to release the ring gear 71 of the torque multiplying and torque combining planetary gear set 59. The direct drive clutch 84 of gear unit 16 remains engaged to rotate the sun gear 92 of the low planetary gear set 58 at the same speed as the converter output shaft 38 and in the gear unit 18 the low brake 102 is engaged to hold the ring gear 101. With the sun gear 92 being driven at converter output shaft speed, the ring gear 71 of gear unit 19 is driven at the greatest reduction ratio provided by the combination of gear units 16 and 18 since gear unit 16 is conditioned for its splitter low drive ratio which is direct drive while gear unit 18 is in its lowest drive. The differential speed between sun gear 64 and ring gear 71 causes the pinions 66 to revolve about the sun gear 64 thus driving the planet carrier 68 and output shaft 69 in the forward direction and at a speed proportional to the differential speed. This combined drive provides the second forward drive ratio between the output shaft 69 and the converter output shaft 38 which is higher than the first forward drive ratio.

To establish the third forward drive ratio, the gear unit 18 remains in its low drive status with the low brake 102 engaged and the gear unit 16 is altered by disengaging the direct drive clutch 84 and engaging the overdrive brake 82. The splitter high drive ratio, which is an overdrive ratio, provided by the torque splitter planetary gear set 54 rotates sleeve 89 and thus sun gear 92 of the low planetary gear set 58 at a speed greater than the converter output shaft 38. With the ring gear 101 of the low planetary gear set 58 in gear unit 18 being restrained from rotation, the planet carrier 96 and thus the ring gear 71 of gear unit 19 are rotated in a higher speed range than that provided when the sun gear 92 is rotated at the same speed as converter output shaft 38. The differential speed between sun gear 64 and ring gear 71 is smaller than that provided in the second forward drive ratio and causes the pinions 66 to revolve in the forward direction about the sun gear 64 to drive the planet carrier 68 and output shaft 69. This combined drive provides the third forward drive ratio which is higher than the second forward drive ratio.

The next ratio change which is to the fourth forward drive ratio is a so-called double transition shift in that both the gear units 16 and 18 are completely reconditioned. In gear unit 16, the overdrive brake 82 is disengaged and the direct drive clutch 84 reengaged so as to again afford the splitter low direct drive ratio in this gear unit. The gear unit 18 is altered for the intermediate drive ratio by the disengagement of the low brake 102 and the engagement of the intermediate brake 112. The ring gear 71 of the gear unit 19 is then rotated in the sped reduction range provided by the intermediate drive ratio of the gear unit 18 since the sleeve 89 is being rotated at converter output shaft speed and with the sun gear 64 rotating at converter output shaft speed, the differential speed between sun gear 64 and ring gear 71 which is smaller than that occurring in the third forward drive ratio determines the fourth forward drive ratio which is higher than the third forward drive ratio.

To establish the fifth forward drive ratio, gear unit 16 is altered by disengaging the direct drive clutch 84 and reengaging the overdrive brake 82 while the gear unit 18 remains in its intermediate drive ratio status. The combined reduction drive provided by the splitter high overdrive ratio of gear unit 16 and the intermediate drive ratio of gear unit 18 drives the ring gear 71 of gear unit 19 in the same direction as converter output shaft 38 and at a reduced speed. Since the sun gear 64 of gear unit 19 is rotating at converter output shaft speed, the relative speed difference between sun gear 64 and ring gear 71 which is smaller than that occurring in the fourth forward drive determines the fifth forward drive ratio which is a higher drive ratio than the fourth forward drive ratio.

The sixth forward drive ratio which is a direct or 1:1 drive ratio between output shaft 69 and converter output shaft 38 requires a double transition shift to place both the gear unit 16 and the gear unit 18 in direct drive which requires that the direct drive clutch 84 of gear unit 16 and the direct drive clutch 114 of gear unit 18 be engaged. With direct drive clutches 84 and 114 engaged, the gear units 16 and 18 respectively are locked up and drive the ring gear 71 of gear unit 19 at converter output shaft speed. Since there is then no relative speed difference between sun gear 64 and ring gear 71, the pinions 66 are effectively locked to the converter output shaft 38 and the output shaft 69 rotates at the same speed as the converter output shaft 38.

The seventh forward drive ratio which is the highest drive ratio and an overdrive ratio is provided by altering the status of gear unit 16 by disengaging the direct drive clutch 84 and reengaging the overdrive brake 82 while the direct drive clutch 114 in gear unit 18 remains engaged. With gear unit 18 effectively locked up by the direct drive clutch 114, the ring gear 71 of gear unit 19 is caused to rotate at a speed faster than the converter output shaft 38 and since the sun gear 64 is rotating at converter output shaft speed the pinions 66 are caused to revolve about the sun gear 64 to drive the planet carrier 68 and thus the output shaft 69 at a speed greater than the converter output shaft 38.

In neutral, the sun gear 64 of gear unit 19 is driven at converter output shaft speed and all drive establishing devices in gear units 18 and 19 are disengaged. The direct drive clutch 84 in gear unit 16 is engaged to control the rotational speed of the elements in gear units 16 and 18 and ring gear 71 rotates freely since the drive establishing devices in gear units 18 and 19 are disengaged.

To establish the reverse drive ratio, the reverse brake 122 in the reversing planetary gear unit 21 is engaged to hold the ring gear 121. The sun gear 64 of gear unit 19 which is rotating at converter output shaft speed transmits torque into the ring gear 71 through the pinions 66. The torque thus introduced into the drive connection 126 by ring gear 71 causes sun gear 124 to rotate in a direction opposite the direction of rotation of converter output shaft 38 and since the ring gear 121 is held stationary, the pinions 118 orbit in the ring gear 121 in a direction opposite that of rotation of converter output shaft 38 to drive through planet carrier 119 the output shaft 69 in the reverse direction. The direct drive clutch 84 in gear unit 16 is engaged to control rotational speeds of the elements in gear units 16 and 18.

When the sun gear 78 has 50 teeth, the sun gear 91 has 40 teeth, the sun gear 92 has 20 teeth, the sun gear 64 has 23 teeth, the sun gear 124 has 36 teeth and the ring gears 76 and 111 each have 102 teeth, the ring gear 101 has 60 teeth, the ring gears 71 and 121 each have 75 teeth, the drive ratios between the output shaft 69 and converter output shaft 38 in the first forward drive ratio is 4.26:1, in the second forward drive ratio is 2.35:1, in the third forward drive ratio is 1.92:1, in the fourth forward drive ratio is 1.70:1, in the fifth forward drive ratio is 1.31:1, in the sixth forward drive ratio is 1.00:1, in the seventh forward drive ratio is 0.727:1 and in the reverse drive ratio is —5.79:1. The drive ratio step pattern is determined by dividing a succeeding higher drive ratio desired to be engaged into the immediately preceding lower drive ratio which is to be disengaged and with the drive ratios provided above and provided that no available drive ratios are to be bypassed while accelerating the load, the step between the first and second forward drive ratios is 1.81 and the largest ratio step, the step between the second and third forward drive ratios is 1.22, the step between the third and fourth forward drive ratios is 1.13, the step between the fourth and fifth forward drive ratios is 1.30, the step between the fifth and sixth forward drive ratios is 1.31 and the step between the sixth and seventh forward drive ratios is 1.38.

The above-described selection of drive ratios as should be apparent provides high starting effort in the lowest drive range and relatively even and small ratio steps for accelerating the load without large changes in engine speed.

When it is desired to have the sixth forward drive ratio provide reduction drive and the seventh forward drive ratio provide the direct drive, the two speed torque splitter planetary gear unit 16' shown in FIGURE 2 is substituted for the splitter unit 16 of FIGURE 1. The units 10, 18, 19 and 21 remain the same and since splitter gear units 16 and 16' are similar, like reference numerals are employed for identifying corresponding parts with the numerals appearing in FIGURE 2 being primed. Referring to FIGURE 2, input to the two speed torque splitter planetary gear 54' of unit 16' is by the ring gear 76' which is connected by the drum 88' to the converter output shaft 38'. The planetary pinions 74' journaled on the output planet carrier assembly 62' mesh with the ring gear 76' and the controlled sun gear 78' which is secured to the hub 79'. Connected to the hub 79' is the drum 81' which may be either restrained from rotaion by the underdrive brake 82' or be prevented from rotation relative to the planet carrier assembly 62' by the direct drive clutch 84'. Planet carrier assembly 62' is connected to the sleeve 89' to provide input to the three speed planetary gear unit as sleeve 89 provides in FIGURE 1. When the sun gear 78' is restrained from rotation by the underdrive brake 82', the reaction at this gear will cause the pinions 74' to planet about sun gear 78' and revolve the planet carrier assembly 62' and connected sleeve 89' in the same direction as the ring gear 76' which is driven by converter output shaft 38' but at a reduced speed with respect thereto to provide the splitter low drive ratio which is then an underdrive ratio. When the direct drive clutch 84' is engaged, relative rotation between the sun gear 78' and pinions 74' is prevented to lock up this gear set to provide the splitter high drive ratio which is then a direct drive ratio between the converter output shaft 38' and the planet carrier assembly 62' and connected sleeve 89'.

The sequence of operation of the units 16', 18, 19 and 21 to provide at least seven different forward drive ratios and a reverse drive ratio is the same as that of the units 16, 18, 19 and 21. Since the splitter gear unit 16' provides an underdrive in the splitter low drive ratio and a direct drive in the splitter high drive ratio, the second, third, fourth and fifth drive ratios are lower than those provided by the embodiment of FIGURE 1 if the teeth numbers remain unchanged and provide greater torque multiplication in this range of operation. The sixth forward drive ratio by this arrangement becomes a reduction drive instead of a direct drive to provide an additional drive range in which torque multiplication is available and the seventh forward drive ratio becomes a direct drive instead of an overdrive.

The gear train arrangement 16', 18, 19 and 21 like gear train arrangement 16, 18, 19 and 21 provides high starting effort in the lowest drive range and relatively even and small ratio steps for accelerating the load without large changes in engine speed.

The above-described embodiments are illustrative of the invention which it will be appreciated may be modified within the scope of the appended claims.

We claim:

1. In a transmission the combination of
   (a) power input means, power output means and a plurality of gear units operable to transmit drive from said power input means to said power output means, (b) said plurality of gear units including a torque multiplying and torque combining planetary gear unit operatively connecting said power input means to said power output means operable in one condition to provide a variable drive ratio when operated with plural input drive, (c) a torque splitter planetary gear unit connected to said power input means operable in one condition to provide an overdrive ratio, (d) and a variable speed planetary gear unit connecting said torque splitter planetary gear unit to said torque multiplying and torque combining planetary gear unit operable in one condition to provide one reduction drive ratio.

2. The invention defined in claim 1 and said torque splitter planetary gear unit being operable in another condition to provide a direct drive ratio.

3. The invention defined in claim 1 and said variable speed planetary gear unit being operable in a second condition to provide a second reduction drive ratio different than said one reduction drive ratio.

4. The invention defined in claim 1 and said variable speed planetary gear unit being operable to provide a direct drive ratio.

5. The invention defined in claim 1 and said torque multiplying and torque combining planetary gear unit being operable in another condition to provide a reduction drive ratio when operated with single input drive.

6. In a transmission the combination of
 (a) power input means, power output means and a plurality of gear units operable to transmit drive from said power input means to said power output means,
 (b) said plurality of gear units including a torque multiplying and torque combining planetary gear unit connecting said power input means to said power output means operable in one condition to provide a reduction drive ratio when operated with single input drive and in another condition to provide a variable drive ratio when operated with plural input drive,
 (c) a two speed torque splitter planetary gear unit connected to said power input means operable in one condition to provide a direct drive ratio and in another condition to provide an overdrive ratio,
 (d) and a three speed planetary gear unit connecting said two speed torque spliter planetary gear unit to said torque multiplying and torque combining planetary gear unit operable in three different conditions to provide three different drive ratios including a direct drive ratio.

7. In a transmission the combination of
 (a) power input means, power output means and a plurality of planetary gear units operable to transmit drive from said power input means to said power output means,
 (b) said plurality of planetary gear units including torque multiplying and torque combining means having an output element and plural input elements, one of said input elements being drive connected to said power input means, a brake directly connected to the other of said input elements operable to hold said other input element, said output element being drive connected to said power output means and said torque multiplying and torque combining means being operable to provide drive to said power output means when both said input elements are driven to drive said power output means in the same direction as said one input element and at a speed proportional to the relative speed difference between said one input element and said another input element and to provide drive to said power input means when said one input element is driven and said other input element is held to drive said power output means in the same direction as said one input element and at a speed proportional thereto,
 (c) torque splitter means having an input element, an output element and another element, said input element being drive connected to said power input means and said torque splitter means being operable to provide drive to said output element when said another element is retarded and said input element is driven to drive said output element at a speed different than the speed of said input element,
 (d) and torque multiplying means having an input element, an output element and another element, said input element being drive connected to said output element of said torque splitter means, said output element being drive connected to said another element of said torque multiplying and torque combining means and said torque multiplying means being operable to provide drive to said output element when said another element is retarded and said input element is driven to drive said output element at a speed less than the speed of said input element.

8. The invention defined in claim 7 and said torque splitter means including means operable to provide a direct drive between said input element and said output element to drive said output element at the same speed as said input element.

9. The invention defined in claim 7 and said torque multiplying means including means operable to provide a direct drive between said input element and said output element to drive said output element at the same speed as said input element.

10. The invention defined in claim 7 and said torque multiplying means including reduction drive means operable to drivingly connect said another element to said output element of said torque splitter means to drive said another element at a speed less than the speed of said input element.

11. In a transmission drive train the combination of
 (a) an input member and an output member,
 (b) a first planetary gear set having a sun gear, a ring gear and a carrier having planetary pinions meshing with said sun gear and said ring gear, said sun gear being drive connected to said input member, said carrier being drive connected to said output member and a brake operable to retard said ring gear to provide drive to said output member when said input member is driven,
 (c) a second planetary gear set having a sun gear, a ring gear and a carrier having planetary pinions meshing with said sun gear and said ring gear, said carrier being rigidly connected to said input member and a brake operable to retard said sun gear to provide drive to said ring gear when said input member is driven,
 (d) and a third planetary gear set having a sun gear, a ring gear and a carrier having planetary pinions meshing with said sun gear and said ring gear, said sun gear being drive connected to said ring gear of said second planetary gear set, said carrier being drive connected to said ring gear of said first planetary gear set and a brake operable to retard said ring gear to provide drive to said output member when said brake of said second planetary gear set is engaged and said input member is driven.

12. The invention defined in claim 11 and said third planetary gear set being located between said first planetary gear set and said second planetary gear set and said input member passing centrally through said second planetary gear set and said third planetary gear set.

13. The invention defined in clim 11 and a clutch operable to prevent relative rotation between said sun gear of said second planetary gear set and said input member.

14. In a transmission drive train the combination of
 (a) an input member and an output member,
 (b) a first planetary gear set having a sun gear, a ring gear and a carrier having planetary pinions meshing with said sun gear and said ring gear, said sun gear being drive connected to said input member, said carrier being drive connected to said output member and a brake operable to retard said ring gear to provide drive to said output member when said input member is driven, (c) a second planetary gear set having a sun gear, a ring gear and a carrier having planetary pinions meshing with said sun gear and said ring gear, said carrier being rigidly connected to said input member, a brake operable to retard said sun gear to provide drive to said ring gear when said input member is driven and a clutch operable to prevent relative rotation between said sun gear and said input member to provide a direct drive to said ring gear when said input member is driven, (d) and a third planetary gear set having a sun gear, a ring gear and a carrier having planetary pinions meshing with said sun gear and said ring gear, said sun gear being drive connected to said ring gear of said second planetary gear set, said carrier being drive connected to said ring gear of said first planetary gear set and a brake operable to retard said ring gear to provide drive to said output member when said brake of said second planetary gear set is engaged and said input member is driven.

15. In a transmission drive train the combination of
(a) an input member and an output member,
(b) a first planetary gear set having a sun gear, a ring gear and a carrier having planetary pinions meshing with said sun gear and said ring gear, said sun gear being drive connected to said input member, said carrier being drive connected to said output member and a brake operable to retard said ring gear,
(c) a second planetary gear set having a sun gear, a ring gear and a carrier having planetary pinions meshing with said sun gear and said ring gear, said carrier being drive connected to said input member, a brake operable to retard said sun gear and a clutch operable to prevent relative rotation between said sun gear and said input member,
(d) a third planetary gear set having a sun gear, a ring gear and a carrier having planetary pinions meshing with said sun gear and said ring gear, said sun gear being drive connected to said ring gear of said second planetary gear set, said carrier being drive connected to said ring gear of said first planetary gear set and a brake operable to retard said ring gear,
(e) and a fourth planetary gear set having a sun gear, a ring gear and a carrier having planetary pinions meshing with said sun gear and said ring gear, said sun gear being drive connected to said ring gear of said second planetary gear set, said carrier being drive connected to said ring gear of said third planetary gear set, a brake operable to retard said ring gear and a clutch operable to prevent relative rotation between said sun gear and said ring gear.

16. In a transmission drive train the combination of
(a) an input member, an output member and a torque multiplying and torque combining planetary gear unit operable to drivingly connect said input member to said output member,
(b) said torque multiplying and torque combining planetary gear unit having an input element, an output element and another element, said output element being drive connected to said output member, said torque multiplying and torque combining planetary gear unit being operable to provide drive to said output member when both said input element and said another element are driven to drive said output member in a forward direction at a speed proportional to the relative speed difference between said input element and said another element,
(c) first input drive means operatively connecting said input member to said input element of said torque multiplying and torque combining planetary gear unit to provide a first torque path, second input drive means operable to connect said input member to said another element of said torque multiplying and torque combining planetary gear unit to provide a second torque path, (d) a torque splitter planetary gear unit in said second torque path operable to apportion the torque between said first and second torque paths and having an input element drive connected to said input member, an output element and another element and a brake for said another element which when retarded causes said output element to be driven in said forward direction at a speed greater than the speed of said input member, (e) and a planetary gear unit in said second torque path comprising a planetary gear set having an input element, an output element and another element, said input element being drive connected to said output element of said torque splitter planetary gear unit, said output element being drive connected to said another element of said torque multiplying and torque combining planetary gear unit and a brake for said another element which when retarded causes said output element to be driven in said forward direction and at a reduced speed relative to said input element.

17. In a transmission drive train the combination of
(a) an input member, an output member and a torque multiplying and torque combining planetary gear unit operable to drivingly connect said input member to said output member,
(b) said torque multiplying and torque combining planetary gear unit having an input element, an output element, and another element, said output element being drive connected to said output member, said torque multiplying and torque combining planetary gear unit being operable to provide drive to said output member when both said input element and said another element are driven to drive said output member in a forward direction at a speed proportional to the relative speed difference between said input element and said another element and a brake for said another element which when retarded and said input element is driven causes said output member to be driven in said forward direction and at a reduced speed relative to said input element,
(c) first input drive means operatively connecting said input member to said input element of said torque multiplying and torque combining planetary gear unit to provide a first torque path, second input drive means operable to connect said input member to said another element of said torque multiplying and torque combining planetary gear unit to provide a second torque path,
(d) a torque splitter planetary gear unit in said second torque path operable to apportion the torque between said first and second torque paths and having an input element drive connected to said input member, an output element and another element, a clutch operative to prevent relative rotation between said another element and said input member which when engaged causes said output element to rotate in said forward direction and at the same speed as said input member and a brake for said another element which when retarded and said input element is driven causes said output element to rotate in said forward direction and at an increased speed relative to said input member,
(e) an a multiple ratio planetary gear unit in said second torque path having first and second planetary gear sets,
(f) said first planetary gear set having an input element, an output element and another element, said input element being drive connected to said output element of said torque splitter planetary gear unit, said first planetary gear set being operable to provide drive to said output element when both said input element and said another element are driven to drive said output element in said forward direction and at a speed proportional to the relative speed difference between said input element and said another element and a brake for said another element which when retarded and said input element is driven causes said output element to be driven in said forward direction and at a reduced speed relative to said input element, (g) and said second planetary gear set having an input element, an output element and another element, said input element being drive connected to said output element of said torque splitter planetary gear unit, said output element being drive connected to said another element of said first planetary gear set, a brake for said another element which when retarded and said input element is driven causes said output element to rotate in said forward direction and at a reduced speed relative to said input element and a clutch operative to prevent relative rotation between said another element and said input element which when engaged drives said output element in said forward direction and at the same speed as said input element.

18. In a transmission the combination of
(a) a hydrodynamic torque converter, a load and a plurality of gear units operable to transmit drive from said hydrodynamic torque converter to said load,
(b) said plurality of gear units including a torque multiplying and torque combining planetary gear unit operatively connecting said hydrodynamic torque converter to said load operable in one condition when operated with single input drive to provide a reduction drive ratio and in another condition when operated with plural input drive to provide a variable drive ratio,
(c) a two speed torque splitter planetary gear unit connected to said hydrodynamic torque converter operable in one condition to provide a direct drive ratio and in another condition to provide an overdrive ratio,
(d) and a three speed planetary gear unit connecting said two speed torque splitter planetary gear unit to said torque multiplying and torque combining planetary gear unit operable in three different conditions to provide three different drive ratios including a direct drive ratio.

19. In a transmission the combination of
(a) a hydrodynamic torque converter, a load and a plurality of planetary gear units operable to transmit drive from said hydrodynamic torque converter to said load,
(b) said plurality of planetary gear units including a torque multiplying and torque combining planetary gear unit having input means, output means and another means, said input means being drive connected to said hydrodynamic torque converter, said output means being drive connected to said load and said torque multiplying and torque combining planetary gear unit being operable to provide drive to said load when both said input means and said another means are driven,
(c) a torque splitter planetary gear unit having input means, output means and another means, said input means being drive connected to said hydrodynamic torque converter and said torque splitter planetary gear unit being operable to provide an overdrive drive to said output means when said another means is retarded and said input means is driven,
(d) and a torque multiplying planetary gear unit having input means, output means and another means, said input means being drive connected to said output means of said torque splitter planetary gear unit, said output means being drive connected to said another means of said torque multiplying and torque combining planetary gear unit and said torque multiplying planetary gear unit being operable to provide reduction drive to said output means when said another means is retarded and said input means is driven.

20. In a transmission the combination of
(a) a hydrodynamic torque converter, a load and a plurality of planetary gear units operable to transmit drive from said hydrodynamic torque converter to said load,
(b) said plurality of planetary gear units including a torque multiplying and torque combining planetary gear unit having input means, output means and another means, said input means being drive connected to said hydrodynamic torque converter, said output means being drive connected to said load and said torque multiplying and torque combining planetary gear unit being operable to provide drive to said load when said another means is retarded and said input means is driven and when both said input means and said another means are driven,
(c) a torque splitter planetary gear unit having input means, output means and another means, said input means being drive connected to said hydrodynamic torque converter and said torque splitter planetary gear unit being operable to provide an overdrive drive to said output means when said another means is retarded and said input means is driven and a direct drive to said output means when said another means is prevented from movement relative to said input means and said input means is driven,
(d) and a torque multiplying planetary gear unit having input means, output means and another means, said input means being drive connected to said output means of said torque splitter planetary gear unit, said output means being drive connected to said another means of said torque multiplying and torque combining planetary gear unit and said torque multiplying planetary gear unit being operable to provide reduction drive to said output means when said another means is retarded and said input means is driven.

21. In a transmission the combination of
(a) power input means, power output means and a plurality of planetary gear units operable to transmit drive from said power input means to said power output means,
(b) said plurality of planetary gear units including torque multiplying and torque combining means having an output element and plural input elements, one of said input elements being drive connected to said power input means, a brake directly connected to the other of said input elements operable to retard said other input element, said output element being drive connected to said power output means and said torque multiplying and torque combining means being operable to provide drive to said power output means when both said input elements are driven and when said one input element is driven and said other input element is retarded,
(c) torque splitter means having an input element, an output element and another element, said input element being drive connected to said power input means and said torque splitter means being operable to provide drive to said output element when said another element is retarded and said input element is driven to drive said output element at a speed less than the speed of said input element,
(d) and torque multiplying means having an input element, an output element and another element, said input element being drive connected to said output element of said torque splitter means, said output element being drive connected to said another element of said torque multiplying and torque combining means and said torque multiplying means being operable to provide drive to said output element when said another element is retarded and said input element is driven to drive said output element at a speed less than the speed of said input element.

22. In a transmission drive train the combination of
   (a) an input member and an output member,
   (b) a first planetary gear set having a sun gear, a ring gear and a carrier having planetary pinions meshing with said sun gear and said ring gear, said sun gear being drive connected to said input member and said carrier being drive connected to said output member, a brake directly connected to said ring gear operable to retard said ring gear,
   (c) a second planetary gear set having a sun gear, a ring gear and a carrier having planetary pinions meshing with said sun gear and said ring gear, said ring gear being drive connected to said input member and a brake operable to retard said sun gear,
   (d) and a third planetary gear set having a sun gear, a ring gear and a carrier having planetary pinions meshing with said sun gear and said ring gear, said sun gear being drive connected to said carrier of said second planetary gear set, said carrier being drive connected to said ring gear of said first planetary gear set and a brake operable to retard said ring gear.

23. In a transmission drive train the combination of
   (a) an input member, an output member and a torque multiplying and torque combining planetary gear unit operable to drivingly connect said input member to said output member,
   (b) said torque multiplying and torque combining planetary gear unit having an input element, an output element and another element, said output element being drive connected to said output member, a brake directly connected to said another element operable to retard said another element, said torque multiplying and torque combining planetary gear unit being operable to provide drive to said output member when both said input element and said another element are driven to drive said output member in a forward direction at a speed proportional to the relative speed difference between said input element and said another element, and also when said input element is driven and said another element is held to drive said output member in said forward direction at a speed proportional to the speed of said input element,
   (c) first input drive means operatively connecting said input member to said input element of said torque multiplying and torque combining planetary gear unit to provide a first torque path, second input drive means operable to connect said input member to said another element of said torque multiplying and torque combining planetary gear unit to provide a second torque path,
   (d) a torque splitter planetary gear unit in said second torque path operable to apportion the torque between said first and second torque paths and having an input element drive connected to said input member, an output element and another element and a brake for said another element which when retarded causes said output element to be driven in said forward direction at a speed less than the speed of said input member,
   (e) and a planetary gear unit in said second torque path comprising a planetary gear set having an input element, an output element and another element, said input element being drive connected to said output element of said torque splitter planetary gear unit, said output element being drive connected to said another element of said torque multiplying and torque combining planetary gear unit and a brake for said another element which when retarded causes said output element to be driven in said forward direction and at a reduced speed relative to said input element.

24. In a transmission drive train the combination of
   (a) an input member, an output member and a torque multiplying and torque combining planetary gear unit operable to drivingly connect said input member to said output member,
   (b) said torque multiplying and torque combining planetary gear unit having an input element, an output element and another element, said output element being drive connected to said output member, said torque multiplying and torque combining planetary gear unit being operable to provide drive to said output member when both said input element and said another element are driven to drive said output member in a forward direction at a speed proportional to the relative speed difference between said input element and said another element and a brake for said another element which when retarded and said input element is driven causes said output member to be driven in said forward direction and at a reduced speed relative to said input element,
   (c) first input drive means operatively connecting said input member to said input element of said torque multiplying and torque combining planetary gear unit to provide a first torque path, second input drive means operable to connect said input member to said another element of said torque multiplying and torque combining planetary gear unit to provide a second torque path,
   (d) a torque splitter planetary gear unit in said second torque path operable to apportion the torque between said first and second torque paths and having an input element drive connected to said input member, an output element and another element, a clutch operative to prevent relative rotation between said another element and said input member which when engaged causes said output element to rotate in said forward direction and at the same speed as said input member and a brake for said another element which when retarded and said input element is driven causes said output element to rotate in said forward direction and at a reduced speed relative to said input member,
   (e) and a multiple ratio planetary gear unit in said second torque path having first and second planetary gear sets,
   (f) said first planetary gear set having an input element, an output element and another element, said input element being drive connected to said output element of said torque splitter planetary gear unit, said output element being drive connected to said another element of said torque multiplying and torque combining planetary gear unit, said first planetary gear set being operable to provide drive to said output element when both said input element and said another element are driven to drive said output element in said forward direction and at a speed proportional to the relative speed difference between said input element and said another element and a brake for said another element which when retarded and said input element is driven causes said output element to be driven in said forward direction and at a reduced speed relative to said input element,
   (g) and said second planetary gear set having an input element, an output element and another element, said input element being drive connected to said output element of said torque splitter planetary gear unit, said output element being drive connected to said another element of said first planetary gear set, a brake for said another element which when retarded and said input element is driven causes said output element to rotate in said forward direction and at a reduced speed relative to said input element and a clutch operative to prevent relative rotation between said another element and said input element which when engaged drives said output element in said forward direction and at the same speed as said input element.

25. In a transmission drive train the combination of
(a) power input means and power output means,
(b) a torque multiplying and torque combining planetary gear unit drive connected to said power output means having plural input means and being operable to provide drive to said power output means when one of said input means is driven and when both said one input means and another of said input means are driven,
(c) plural drive transmitting means operative to transmit drive from said power input means to said torque multiplying and torque combining planetary gear unit including first drive transmitting means providing a power path to said one input means and second drive transmitting means providing a power path to said another input means,
(d) a torque splitter planetary gear unit in one of said power paths operable to apportion torque input from said power input means between said power paths,
(e) a variable ratio planetary gear unit in said one power path operable to provide a plurality of different drive ratios,
(f) and said torque splitter planetary gear unit being operable to provide an overdrive ratio.

26. In a transmission drive train the combination of
(a) power input means and power output means,
(b) a torque multiplying and torque combining planetary gear unit drive connected to said power output means having plural input means and being operable to provide a reduction drive to said power output means when one of said input means is driven to drive said power output means at a speed less than and proportional to the speed of said one input means and another drive to said power output means when both said one input means and another of said input means are driven to drive said power output means at a speed proportional to the relative speed difference between said one input means and said another input means,
(c) first drive transmitting means operative to transmit drive from said power input means to said one input means to provide a first power path, second drive transmitting means operative to transmit drive from said power input means to said another input means to provide a second power path,
(d) a torque splitter planetary gear unit in one of said first and second power paths operable to apportion torque input from said power input means between said first and second power paths,
(e) a variable ratio planetary gear unit in said one power path operable to provide a plurality of different drive ratios,
(f) and said torque splitter planetary gear unit being operable to provide a direct drive ratio and an overdrive ratio.

27. In a transmission the combination of
(a) power input means, power output means and a plurality of planetary gear units operable to transmit drive from said power input means to said power output means,
(b) said plurality of planetary gear units including torque multiplying and torque combining means having an output element and plural input elements, one of said input elements being drive connected to said power input means, said output element being drive connected to said power output means and said torque multiplying and torque combining means being operable to provide drive to said power output means when said one input element and another of said input elements are driven to drive said power output means in the same direction as said one input element and at a speed proportional to the relative speed difference between said one input element and said another input element,
(c) torque splitter means having an input element, an output element and another element, said input element being drive connected to said power input means and said torque splitter means being operable to provide drive to said output element when said another element is retarded and said input element is driven to drive said output element at a speed different than the speed of said input element,
(d) torque multiplying means having an input element, an output element and another element, said input element being drive connected to said output element of said torque splitter means, said output element being drive connected to said another element of said torque multiplying and torque combining means and said torque multiplying means being operable to provide drive to said output element when said another element is retarded and said input element is driven to drive said output element at a speed less than the speed of said input element,
(e) and reversing means having an input element, an output element and another element, said input element being drive connected to said another element of said torque multiplying and torque combining means, said output element being drive connected to said power output means and said reversing means being operable to provide drive to said power output means when said another element is retarded and said input element is driven to drive said power output means in a direction opposite that of said power input means and at a speed less than the speed of said input element.

28. In a transmission drive train the combination of
(a) an input member and an output member,
(b) a first planetary gear set having a sun gear, a ring gear and a carrier having planetary pinions meshing with said sun gear and said ring gear, said sun gear being drive connected to said input member and said carrier being drive connected to said output member,
(c) a second planetary gear set having a sun gear, a ring gear and a carrier having planetary pinions meshing with said sun gear and said ring gear, said carrier being drive connected to said input member and a brake operable to retard said sun gear,
(d) a third planetary gear set having a sun gear, a ring gear and a carrier having planetary pinions meshing with said sun gear and said ring gear, said sun gear being drive connected to said ring gear of said second planetary gear set, said carrier being drive connected to said ring gear of said first planetary gear set and a brake operable to retard said ring gear,
(e) and a fourth planetary gear set having a sun gear, a ring gear and a carrier having planetary pinions meshing with said sun gear and said ring gear, said sun gear being drive connected to said ring gear of said second planetary gear set, said carrier being drive connected to said ring gear of said third planetary gear set, and a brake operable to retard said ring gear.

29. In a transmission drive train the combination of
(a) an input member and an output member,
(b) a first planetary gear set having a sun gear, a ring gear and a carrier having planetary pinions meshing with said sun gear and said ring gear, said sun gear being drive connected to said input member and said carrier being drive connected to said output member,
(c) a second planetary gear set having a sun gear, a ring gear and a carrier having planetary pinions meshing with said sun gear and said ring gear, said carrier being drive connected to said input member and a brake operable to retard said sun gear,
(d) a third planetary gear set having a sun gear, a ring gear and a carrier having planetary pinions meshing with said sun gear and said ring gear, said sun gear being drive connected to said ring gear of said second planetary gear set, said carrier being drive connected to said ring gear of said first planetary gear set and a brake operable to retard said ring gear, (e) a fourth planetary gear set having a sun gear, a ring gear and a carrier having planetary pinions meshing with said sun gear and said ring gear, said sun gear being drive connected to said ring gear of said second planetary gear set, said carrier being drive connected to said ring gear of said third planetary gear set, and a brake operable to retard said ring gear, (f) and a clutch operable to prevent relative rotation between said sun gear and said ring gear of said fourth planetary gear set.

30. In a transmission drive train the combination of
(a) an input member and an output member,
(b) a first planetary gear set having a sun gear, a ring gear and a carrier having planetary pinions meshing with said sun gear and said ring gear, said sun gear being drive connected to said input member and said carrier being drive connected to said output member,
(c) a second planetary gear set having a sun gear, a ring gear and a carrier having planetary pinions meshing with said sun gear and said ring gear, said carrier being drive connected to said input member and a brake operable to retard said sun gear,
(d) a third planetary gear set having a sun gear, a ring gear and a carrier having planetary pinions meshing with said sun gear and said ring gear, said sun gear being drive connected to said ring gear of said second planetary gear set, said carrier being drive connected to said ring gear of said first planetary gear set and a brake operable to retard said ring gear,
(e) a fourth planetary gear set having a sun gear, a ring gear and a carrier having planetary pinions meshing with said sun gear and said ring gear, said sun gear being drive connected to said ring gear of said second planetary gear set, said carrier being drive connected to said ring gear of said third planetary gear set, and a brake operable to retard said ring gear,
(f) and a fifth planetary gear set having a sun gear, a ring gear and a carrier having planetary pinions meshing with said sun gear and said ring gear, said sun gear being drive connected to said ring gear of said first planetary gear set, said carrier being drive connected to said output member and a brake operable to retard said ring gear.

31. In a transmission the combination of
(a) an input member and an output member,
(b) a torque multiplying and torque combining planetary gear unit operable to drive said output member when operated with plural input drive,
(c) drive transmitting means providing plural power paths from said input member to said torque multiplying and torque combining planetary gear unit,
(d) a torque splitter planetary gear unit in one of said power paths operable to apportion torque input from said input member between said power paths,
(e) and a multi-ratio planetary gear unit having ratio establishing devices operable to selectively provide at least three different unidirectional speed ratio drives between said torque splitter planetary gear unit and said torque multiplying and torque combining planetary gear unit on engagement of only one of said ratio establishing devices.

32. In a transmission drive train the combination of
(a) power input means and power output means,
(b) a torque multiplying and torque combining planetary gear unit drive connected to said power output means having plural input means and being operable to provide drive to said power output means when one of said input means is driven and the other of said input means is held and when both said input means are driven, a brake directly connected to said other input means operable to hold said other input means,
(c) plural drive transmitting means operative to transmit drive from said power input means to said torque multiplying and torque combining planetary gear unit including first drive transmitting means providing a power path to said one input means and second drive transmitting means providing a power path to said other input means,
(d) a torque splitter planetary gear unit in one of said power paths operable to apportion torque input from said power input means between said power paths,
(e) a variable ratio planetary gear unit in said one power path operable to provide a plurality of different drive ratios,
(f) and said variable ratio planetary gear unit being operable to provide two different reduction drive ratios.

33. In a transmission drive train the combination of
(a) power input means and power output means,
(b) a torque multiplying and torque combining planetary unit drive connected to said power output means having plural input means and being operable to provide a reduction drive to said power output means when one of said input means is driven and the other of said input means is held to drive said power output means at a speed less than and proportional to the speed of said one input means and another drive to said power output means when both said input means are driven to drive said power output means at a speed proportional to the relative speed difference between said one input means and said other input means, a brake directly connected to said other input means operable to hold said other input means,
(c) first drive transmitting means operative to transmit drive from said power input means to said one input means to provide a first power path, second drive transmitting means operative to transmit drive from said power input means to said other input means to provide a second power path,
(d) a torque splitter planetary gear unit in one of said first and second power paths operable to apportion torque input from said power input means between said first and second power paths,
(e) a variable ratio planetary gear unit in said one power path operable to provide a plurality of different drive ratios,
(f) and said variable ratio planetary gear unit being operable to provide two different reduction drive ratios and a direct drive ratio.

References Cited by the Examiner

UNITED STATES PATENTS

| | | | |
|---|---|---|---|
| 2,159,427 | 5/1939 | Dunn | 74—759 |
| 2,519,022 | 8/1950 | Burtnett | 74—765 |
| 2,645,135 | 7/1953 | Frank | 74—682 |
| 2,799,184 | 7/1957 | Miller | 74—682 |
| 2,939,341 | 6/1960 | Evernden | 74—682 |
| 3,096,666 | 7/1963 | Christenson et al. | 74—765 |
| 3,097,544 | 7/1963 | Evernden | 74—688 |

FOREIGN PATENTS 644,397   7/1962   Canada.

DAVID J. WILLIAMOWSKY, *Primary Examiner.*

THOMAS C. PERRY, *Examiner.*